July 27, 1948.  A. AMIGO  2,446,038
MOLDING OF BOXES FROM LAMINATIONS OF FELTED
FIBROUS MATERIAL IMPREGNATED WITH
SYNTHETIC RESIN Filed Nov. 29, 1943  2 Sheets-Sheet 1

Inventor
A. Amigo
By Glascock Downing Seible
(attys)

July 27, 1948.  A. AMIGO  2,446,038
MOLDING OF BOXES FROM LAMINATIONS OF FELTED
FIBROUS MATERIAL IMPREGNATED WITH
SYNTHETIC RESIN Filed Nov. 29, 1943  2 Sheets-Sheet 2

Inventor
A. Amigo

Patented July 27, 1948

2,446,038

UNITED STATES PATENT OFFICE 2,446,038

MOLDING OF BOXES FROM LAMINATIONS OF FELTED FIBROUS MATERIALS IMPREGNATED WITH SYNTHETIC RESINS

Alfonso Amigo, Ealing, London, England, assignor of one-half to Ebonestos Industries Limited, London, England Application November 29, 1943, Serial No. 512,269
In Great Britain October 18, 1943

2 Claims. (Cl. 154—1)

This invention relates to the moulding of boxes from a packet of suitably shaped laminations of felted fibrous material impregnated with synthetic resins.

One of the difficulties encountered in the moulding of boxes from such a packet has been to produce a box the corners of which will be of the required adequate strength, and the main object of the invention is to provide a method of moulding of such boxes by which this difficulty is overcome.

In the accompanying drawings illustrating diagrammatically and by way of example, one mode of carrying the invention into effect:

Figure 1:
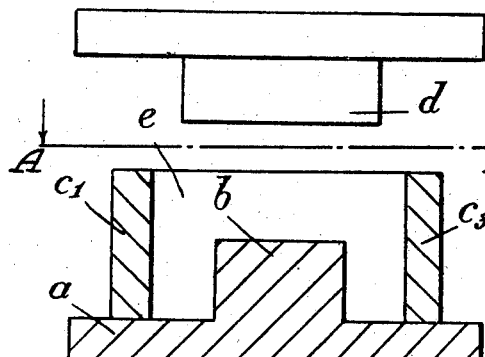
Figures 1 and 2 show in part sectional elevation and in plan view respectively, the arrangement of the constituent parts of the mould prior to the application of the moulding pressure, the plan in Figure 2 being shown along the line A—A in Figure 1.
Figure 3:
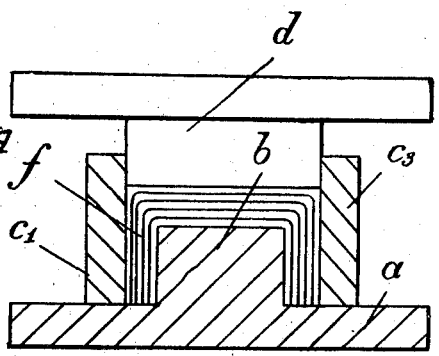
Figures 3 and 4 are the views corresponding to Figures 1 and 2 respectively, after the completion of the application of the moulding pressure.
Figure 2:
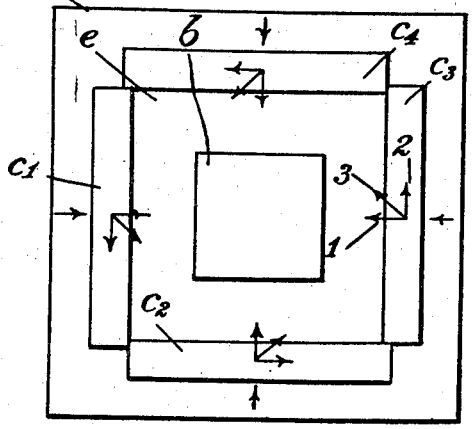
Figure 4:
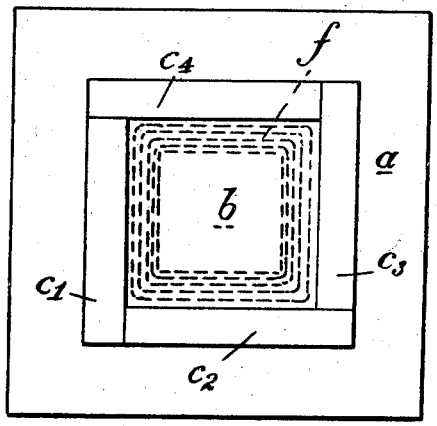

Referring to Figures 1 to 4, $a$ is a base plate carrying the inner moulding member $b$ and on which the side moulding members $c_1$, $c_2$, $c_3$, $c_4$ are slidingly mounted. $d$ is the movable top part of the mould, and $e$ is the space within which the packet of laminations $f$, indicated in Figures 3 and 4, is moulded to the shape of a box. After placing the packet of laminations over the inner member $b$, as hereinafter explained, the top part $d$ of the mould is lowered and allowed to rest on top of the laminated packet pressing it down by gravity and compressing it. The side moulding members $c_1$ to $c_4$ are then moved inwardly until they abut against each other as shown in Figure 2, enclosing a space $e$ which is substantially wider, e. g. approximately twice the thickness of the wall of the box to be moulded.

An essential feature of the invention is that the sides of the box are compressed to the desired thickness, as shown in Figures 3 and 4 by the side moulding members being moved from the position shown in Figure 2 to that shown in Figure 4 while remaining constantly in contact with each other. This is ensured by causing each of the side moulding members while pressed in the direction indicated by the arrow 1 and forced to move inwardly, also to slide sideways in the direction indicated by the arrow 2, so that the actual movement takes place in the direction of the arrow 3.

After the side moulding members have reached the position shown in Figures 3 and 4, a final compression pressure is applied to the top part $d$ of the mould to reduce the thickness of the bottom part of the box to that of its sides.

When the packet of laminations is first placed and bent over the inner member $b$, although all the laminations are of the same size their ends are relatively staggered, those of the outermost laminations lying highest and those of the innermost ones, lowest. By first allowing the top part of the mould to rest on and compress the part forming the bottom of the box, then simultaneously moving the side members, and finally applying a further pressure to the top part of the mould, the staggering of the ends is rectified.

Figure 5:
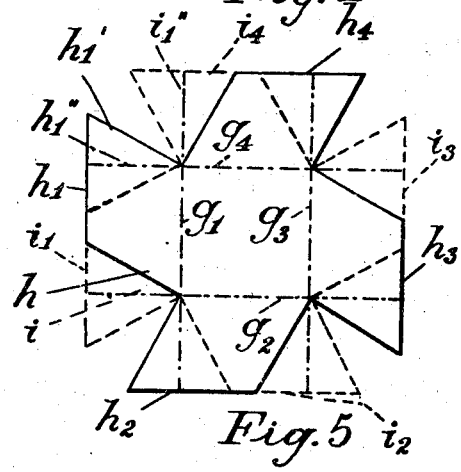
Figures 5 and 6 show diagrammatically one example of the shape of adjacent laminations superposed in the packet, as viewed in plan prior to and after bending down in the mould respectively.
Figure 6:
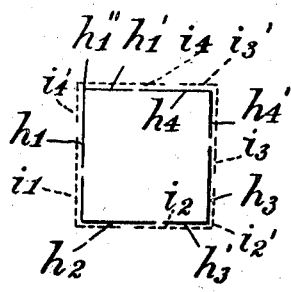

Referring to Figures 5 and 6 illustrating by way of example one method of ensuring the interlocking of the laminations at the corners of the box, all the laminations are specially cut to have the shape shown, viz., a rectangular bottom surface and side surfaces in the shape of parallelograms alternate laminations $h$, $i$, being reversed when they are superposed. In this way it is ensured that when the sides $h_1$, $h_2$, $h_3$, $h_4$ of the lamination $h$ are bent down on the inner member, along the lines $g_1$, $g_2$, $g_3$, $g_4$, a major portion thereof will cover the corresponding side of the inner member, whilst a smaller triangular overlapping portion viz., $h_1'$ will come to lie after bending along the line $h_1''$, on the portion of the adjacent side of the inner member left uncovered by the side $h_4$ of the lamination $h$ and so on. The actual interlocking is attained by each alternate lamination $i$ being reversed, so that when its sides $i_1$, $i_2$, $i_3$, $i_4$ are bent down on the inner member, their major portion $i_4$ will cover $h_1'$ and part of $h_4$ and the smaller triangular overlapping portion viz., $i_4'$ will come to lie, after bending along the line $i_4''$, on the part of the adjacent side $h_1$ of the lamination $h$ left uncovered by $i_1$ and so on. For the sake of simplicity only two laminations have been shown, it being understood that a greater number is actually used for the manufacture of the box.

The invention hereinbefore described may be applied to the construction of boxes of any polygonal section. The laminations may be cut to other shapes than that shown in Figure 5 provided each of the sides has a projecting portion which upon being bent comes to lie on an adjacent side of the inner member to overlap, and be overlapped by, the sides of the preceding and following lamination. Further, instead of securing the inner moulding member to the base $a$, the said member may be constituted by the movable moulding part $d$, in which case the bottom of the box will be formed on the base $a$, the packet of laminations being placed on the latter with its side portions bent upwards to lie against the inner surfaces of the side moulding members.

Figure 7:
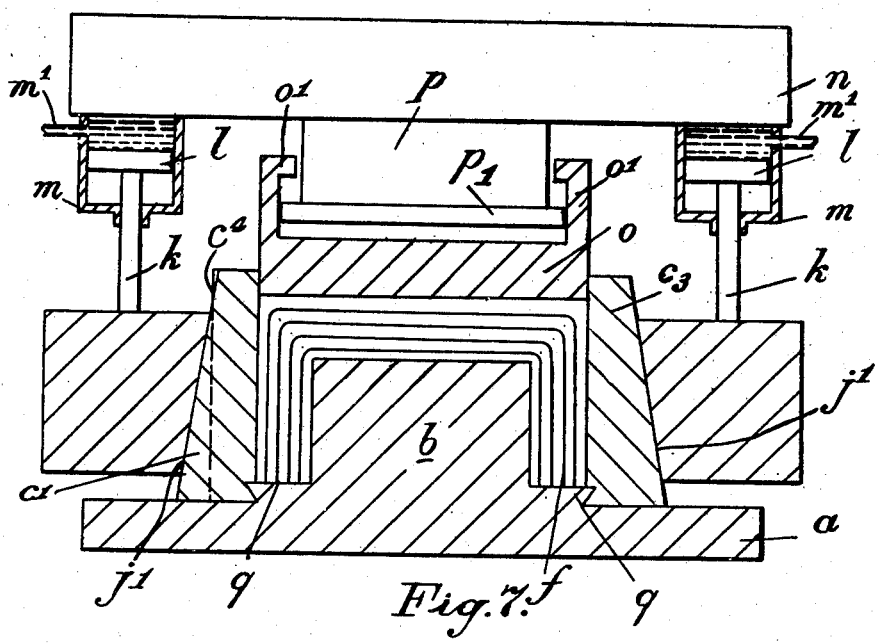
Figures 7 and 8 show diagrammatically in part sectional elevation and in part sectional plan respectively the use of a hydraulic press for moulding a box according to the present invention.
Figure 8:
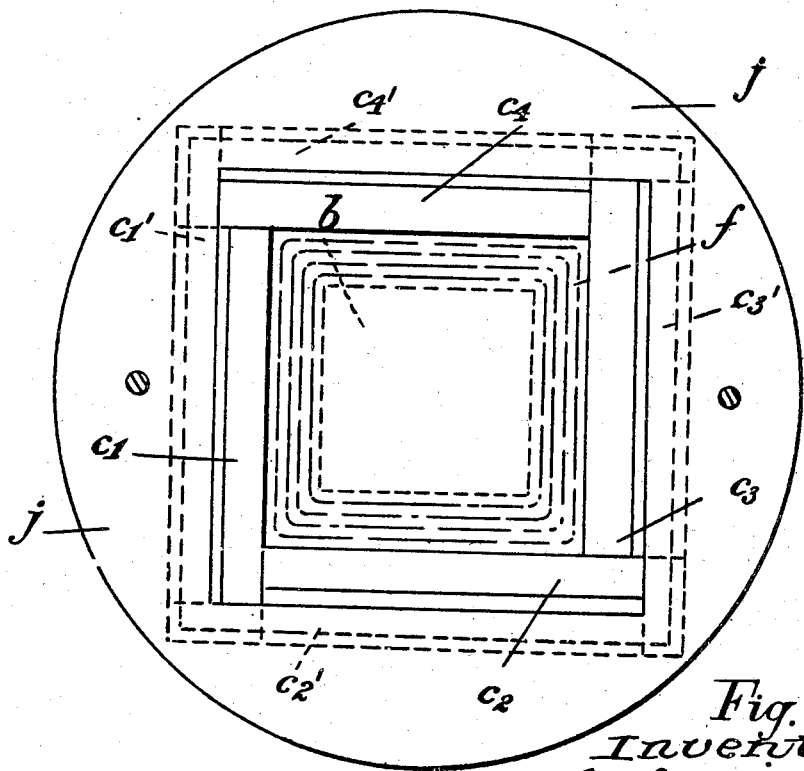

Referring to Figures 7 and 8 illustrating the use of a hydraulic press for moulding a box according to the present invention, the four side moulding plates $c_1$, $c_2$, $c_3$, $c_4$ are provided with inclined outer surfaces $c_{1'}$, $c_{2'}$, $c_{3'}$, $c_{4'}$ and are surrounded by a pressure frame $j$ provided with an opening having an inclined inner peripheral surface $j'$ corresponding to the inclination of the outer surfaces $c_{1'}$—$c_{4'}$ of the side moulding plates. The pressure frame $j$ is suspended from the ram plate $n$ of the press by means of connecting rods $k$ and pistons $l$ working in hydraulic cylinders $m$ connected to an accumulator (not shown) by a pipe $m'$. A bottom moulding plate $o$ is carried by hooks $o_1$ on the flange $p_1$ of the ram $p$ attached to the ram plate $n$.

The moulding operation by the press is effected as follows: After the packet of laminations has been placed on the inner moulding member $b$ as above explained, the ram plate $n$ is caused to descend. During this descent the bottom moulding plate $o$ carried by the ram $p$ comes to lie on top of the bottom forming part of the packet of laminations $f$ as shown in Figure 7 and as the downward movement of the ram plate $n$ continues, hooks $o'$ of the plate $o$ become disengaged from the ram $p$ and the plate $o$ is left to compress the bottom of the box by gravity. The descent of the ram plate $n$ continues accompanied by a descent of the pressure frame $j$ owing to the pressure in the cylinder $m$ and the tapered inner periphery of the frames comes into engagement with the inclined outer surfaces of the side moulding plates $c_1$—$c_4$, the latter being now in the position corresponding to the diagram shown in Figure 2. The further descent of the frame $j$ gradually causes the side moulding plates to move in the directions explained with reference to Figure 2 until they come into the positions shown in Figure 4 and also shown in Figures 7 and 8. It will be seen from the latter figures that whilst the sides of the box have been reduced to the required thickness by the side moulding plates having reached their final positions, the bottom is thicker than the sides. The further reduction in thickness of the bottom part of the box is effected by the ram $p$ being moved downwards to press down the bottom moulding plate $o$ over the required distance, during a still further downward movement of the ram plate $n$. This latter movement of the ram plate $n$ does not effect any further movement of the side moulding plates, its displacement relatively to the pressure frame $j$ being allowed by an upward displacement of the pistons $l$ within the cylinders $m$ forcing the liquid into the accumulator (not shown).

In order to prevent the side moulding plates $c_1$—$c_4$ from being shifted upwards, when the pressure frame $j$ is subsequently withdrawn, they are provided at their lower inner ends with indentations adapted to engage in their innermost positions with projections $q$ on the base $a$ as shown in Figure 7.

The details for carrying the invention into effect may be modified without departing from its scope.

I claim:

1. An apparatus for moulding boxes from a packet of laminations of felted fibrous material impregnated with synthetic resins in which the laminations are cut to present a central portion for the bottom of the box and side portions for its sides, the said portion and portions forming a hollow space between them, comprising a base plate; an inner moulding member projecting from the said base plate; a plurality of movable side moulding members, each side member corresponding to one side of the box and each abutting with its inner surface near the edge at one end against the end of one of the two adjacent side members and with the other end against the inner surface of the other adjacent side member near the edge of the latter, thereby forming an enclosure around the projecting inner member and the enclosed space thus obtained being capable of being reduced by a relative sliding movement of adjacent side members of each other in order to compress the portions of the laminated packet forming the sides of the boxes between the side moulding members and the projecting inner member; a separate movable top moulding member positioned above the inner moulding member and intended to be displaced into part of the space enclosed by the side members above the inner moulding member to form the bottom of the box between itself and the projecting inner moulding member; and means for moving the said side and top moulding members towards the inner member.

2. An apparatus for moulding boxes from a packet of laminations of felted fibrous material impregnated with synthetic resins in which the laminations are cut to present a central portion for the bottom of the box and side portions forming its sides, the said portion and portions forming a hollow space between them comprising: a base plate, an inner moulding member projecting from the said base plate, a plurality of movable side moulding members having downwardly and outwardly inclined outer surfaces, each side member corresponding to one side of the box and each abutting with its inner surface near the edge at one end against the end of one of the two adjacent side members and with the other end against the inner surface of the adjacent side member near the edge of the latter, thereby forming an enclosure around the projecting inner member and the enclosed space thus obtained being capable of being reduced by a relative sliding movement of adjacent side members of each other in order to compress the portions of the laminated packet forming the sides of the boxes between the side moulding members and the projecting inner member; a separate movable top moulding member positioned above the inner moulding member and intended to be displaced into part of the space enclosed by the side members above the inner moulding member to form the bottom of the box between itself and the projecting inner moulding member; and means for moving the said side and top moulding members towards the inner member, consisting of a hydraulic press for applying the required moulding pressure, the movable top moulding member having hook-like members to enable it to be carried by the ram of the press which ram has a flange for that purpose and the press including a pressure frame having an opening with an inclined inner peripheral surface corresponding to the downward inclination of the outer surfaces of the side moulding members, which it is intended to surround, and pressure cylinders carried by the ram and comprising pistons and piston rods by which the pressure frame is suspended, whereby during its descent the ram can first become disengaged from the movable top moulding member when the latter reaches the bottom part of the box to be formed and rests thereon by gravity thereby applying an initial moulding pressure thereto before the subsequent application of a final moulding pressure by the ram and whereby the descent of the pressure frame causes the side moulding members to effect the sliding movement referred to.

ALFONSO AMIGO.

REFERENCES CITED

The following references are of record in the file of this patent:

UNITED STATES PATENTS

| Number | Name | Date |
|---|---|---|
| 528,612 | Shaw | Nov. 6, 1894 |
| 861,418 | Wright | July 30, 1907 |
| 1,284,706 | Kempton | Nov. 12, 1918 |
| 1,417,743 | Kempton | May 30, 1922 |
| 1,467,311 | Elliott | Sept. 11, 1923 |
| 1,599,524 | Hall et al. | Sept. 14, 1926 |
| 1,652,940 | Hottel | Dec. 13, 1927 |
| 1,669,266 | Stevens | May 8, 1928 |
| 1,839,436 | Wood | Jan. 5, 1932 |
| 2,043,366 | Bech | June 9, 1936 |
| 2,072,694 | Walter | Mar. 2, 1937 |
| 2,133,675 | Bosch | Oct. 18, 1938 |